(12) United States Patent  (10) Patent No.: US 9,117,113 B2
Popa et al.  (45) Date of Patent:  Aug. 25, 2015

(54) SILHOUETTE-BASED POSE ESTIMATION

(75) Inventors: Tiberiu Popa, Zurich (CH); Marcel Germann, Zurich (CH); Richard Keiser, Zurich (CH); Markus Gross, Uster (CH); Remo Ziegler, Uster (CH)

(73) Assignee: LIBEROVISION AG, Zürich (CH)

( * ) Notice: Subject to any disclaimer, the term of this patent is extended or adjusted under 35 U.S.C. 154(b) by 110 days.

(21) Appl. No.: 14/117,593

(22) PCT Filed: May 8, 2012

(86) PCT No.: PCT/CH2012/000100
§ 371 (c)(1),
(2), (4) Date: Mar. 6, 2014

(87) PCT Pub. No.: WO2012/155279
PCT Pub. Date: Nov. 22, 2012

(65) Prior Publication Data
US 2014/0219550 A1   Aug. 7, 2014

Related U.S. Application Data

(60) Provisional application No. 61/485,919, filed on May 13, 2011.

(51) Int. Cl.
*G06K 9/00* (2006.01)
*G06T 7/00* (2006.01)

(52) U.S. Cl.
CPC ........ *G06K 9/00342* (2013.01); *G06K 9/00724* (2013.01); *G06T 7/0042* (2013.01); *G06T 2207/10021* (2013.01); *G06T 2207/30196* (2013.01); *G06T 2207/30228* (2013.01)

(58) Field of Classification Search
CPC .................. G06K 9/00342; G06K 9/00724
USPC ........ 382/154; 345/419–427; 356/12; 348/42
See application file for complete search history.

(56) References Cited

U.S. PATENT DOCUMENTS 6,597,801 B1 * 7/2003 Cham et al. ............... 382/103
8,320,621 B2 * 11/2012 McEldowney .............. 382/103
(Continued)

OTHER PUBLICATIONS

International Search Report for PCT application No. PCT/CH2012/000100 mailed on Jan. 15, 2013 (5 pages).
(Continued)

*Primary Examiner* — Samir Ahmed
(74) *Attorney, Agent, or Firm* — Oppedahl Patent Law Firm LLC

(57) ABSTRACT

Estimating a pose of an articulated 3D object model (4) by a computer is done by •obtaining a sequence of source images (10) and therefrom corresponding source image segments (13) with objects (14) separated from the image background; •matching such a sequence (51) with sequences (52) of reference silhouettes (13'), determining one or more selected sequences of reference silhouettes (13') forming a best match; •for each of these selected sequences of reference silhouettes (13'), retrieving a reference pose that is associated with one of the reference silhouettes (13'); and •computing an estimate of the pose of the articulated object model (4) from the retrieved reference pose or poses. The result of these steps is an initial pose estimate, which then can be used in further steps, for example, for maintaining local consistency between pose estimates from consecutive frames, and global consistency over a longer sequence of frames.

20 Claims, 4 Drawing Sheets

(56) References Cited

U.S. PATENT DOCUMENTS

| | | | | |
|---|---|---|---|---|
| 8,351,646 | B2* | 1/2013 | Fujimura et al. | 382/103 |
| 8,682,028 | B2* | 3/2014 | Geiss | 382/103 |
| 8,879,831 | B2* | 11/2014 | Kohli et al. | 382/159 |
| 2009/0232353 | A1* | 9/2009 | Sundaresan et al. | 382/103 |
| 2010/0034462 | A1* | 2/2010 | Nevatia et al. | 382/190 |
| 2010/0303289 | A1* | 12/2010 | Polzin et al. | 382/103 |
| 2011/0210915 | A1* | 9/2011 | Shotton et al. | 345/157 |
| 2012/0239174 | A1* | 9/2012 | Shotton et al. | 700/93 |

OTHER PUBLICATIONS

Dimitrijevic, M. et al. "Human Body Pose 1-3 Recognition Using Spatio-Temporal Templates", Workshop on Modeling People and Human Interaction at the ICCV 2005, Jan. 1, 2005, XP055033869, Beijing, China, 8 pages.

Germann, M. et al. "Articulated Billboards for Video-based Rendering". Computer Graphics Forum, Wiley-Blackwell Publishing Ltd., GB, vol. 29. No. 2, May 1, 2010, pp. 585-594.

Germann, M. et al. "Space-Time Body Pose Estimation in Uncontrolled Environments", 3D Imaging Modeling Processing Visualization and Transmission (3DIMPVT) 2011 International Conference on IEEE, May 16, 2011, pp. 244-251.

Ong, E. J, et al. "Viewpoint Invariant Exemplar-Based 3D Human Tracking", Computer Vision and Image Understanding, Academic Press, US. vol. 104. No. 2-3, Nov. 1, 2006, pp. 178-189.

International Preliminary Report on Patentability, Chapter 1 dated Nov. 19, 2013 from PCT/CH2012/000100 entitled "Silhouette-based Pose Estimation" filed on May 8, 2012 in the name of LiberoVision AG et al., 11 pages.

* cited by examiner

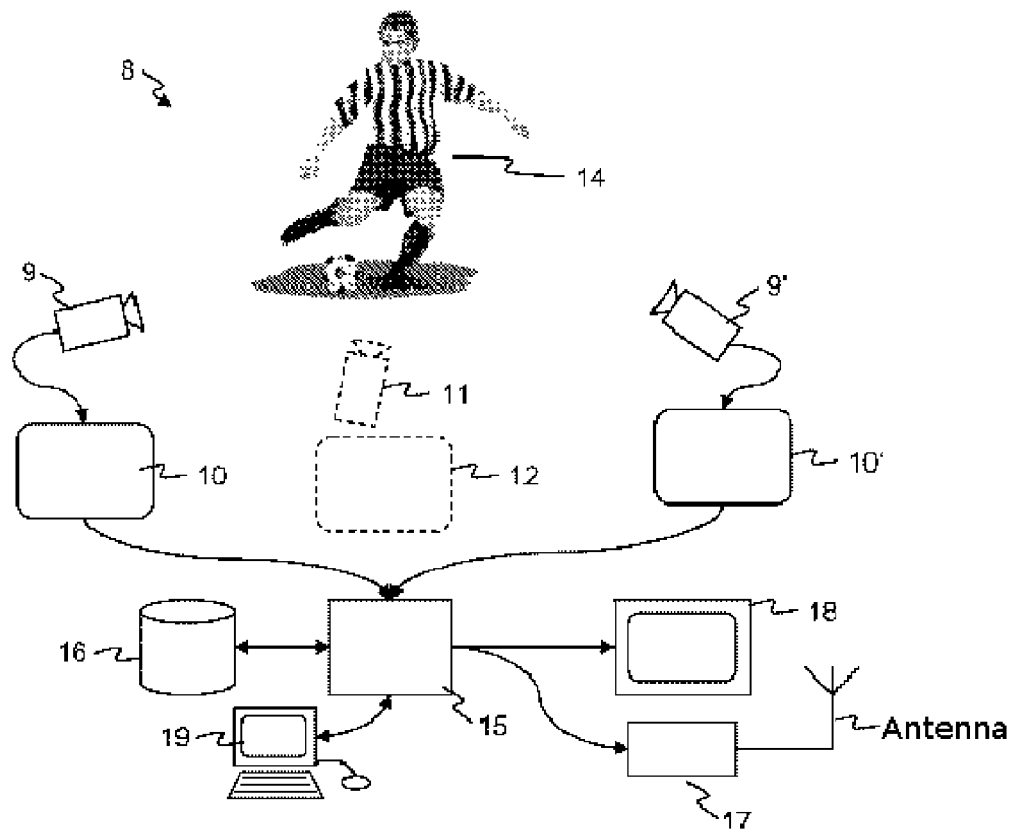
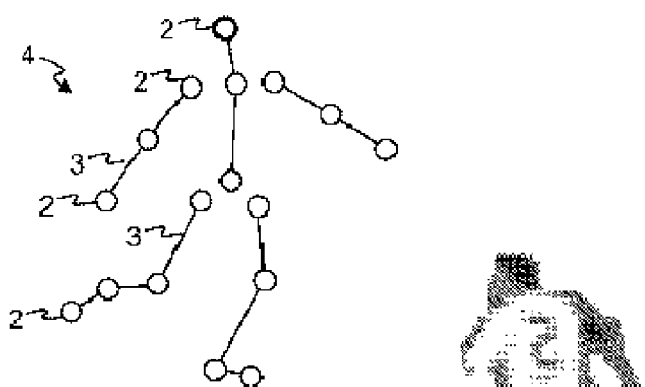
Fig. 2
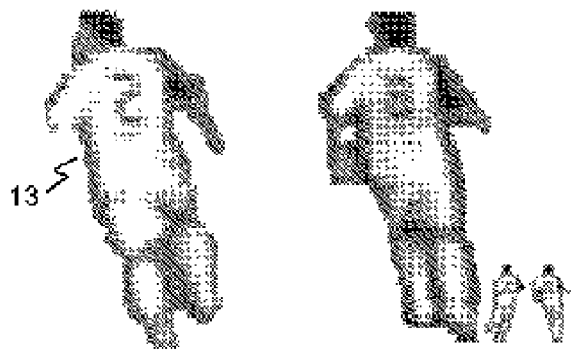
Fig. 3a   Fig. 3b
Fig. 1

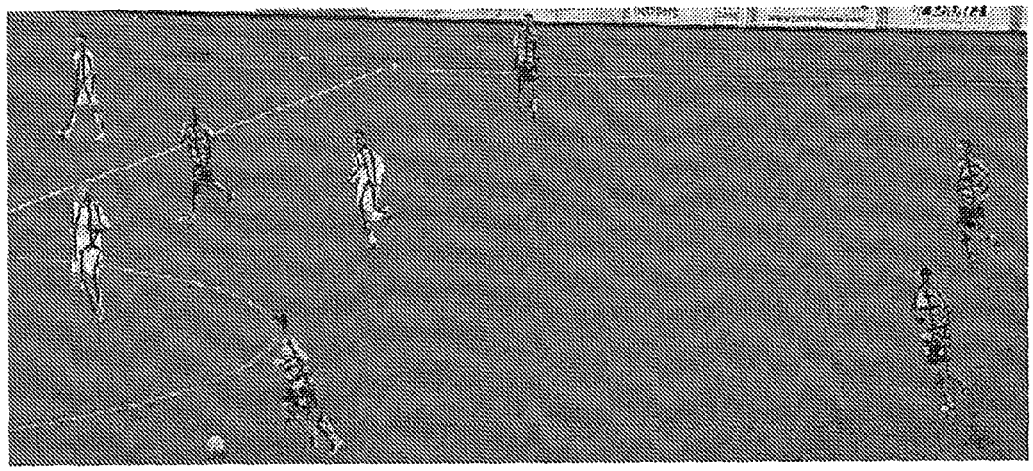
Fig. 4
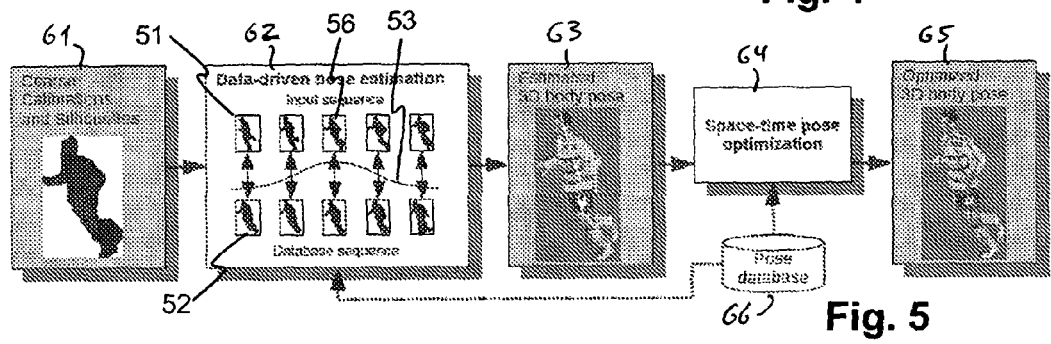
Fig. 5
(a) (b) (c)  Fig. 6
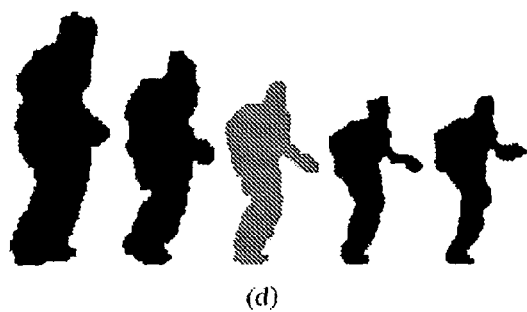
(d)

SILHOUETTE-BASED POSE ESTIMATION

The invention relates to the field of computer image processing. It relates to a method and a system for estimating a pose of an articulated object model and/or for optimizing an estimate of a pose of an articulated object model that represents a body which is observed by one or more cameras, as described in the preamble of the corresponding independent claims.

BACKGROUND

1. Introduction

Pose estimation or motion capture is a fundamental problem in computer vision and graphics [13, 14] with many applications such as character animation in games and movies, controller free interfaces for games [12] and surveillance. Due to the complexity of the problem, there still does not exist a universal solution to all the applications. The solutions strongly depend on the conditions and on the constraints imposed on the setup. In general, the more constraints are imposed on the setup, the more accurately the pose estimation can be computed. In real world scenarios it is often very difficult to impose constraints on the setup. However, many practical applications are based on these scenarios. For instance, Germann et al [11] shows how accurate pose estimation can be used for high quality rendering of players from an arbitrary view-point during a sports game using only video footage already available in TV broadcasts. In addition to applications in rendering, accurate pose estimation of players during a game can also be used for bio-mechanical analysis and synthesis as well as for game statistics or even the porting of a real game play into a computer game.

2. Related Work

Many current commercially available motion capture systems [22] typically use optical markers placed all over the body to track the motion over time. These systems are very accurate and can capture all kinds of body poses as well as facial expressions. However, they are invasive and work under controlled environment. Therefore, they are only suitable for a specific range of applications.

Markerless motion capture methods have received a lot of attention in the last decade [13, 14]. Based on the type of footage used, the markerless pose reconstruction (or motion capture) problem can be roughly categorized into two groups [24]: using video sequences from one camera or using footage from multiple calibrated cameras. Pose estimation from monocular video sequences [2, 3, 24, 17, 1, 18] can be more convenient for some applications as it imposes less restrictions on the user, but it has an inherent depth ambiguity. This ambiguity can be solved using structure from motion approaches, a very difficult problem in vision [13, 14]. Structure from motion algorithms typically rely on high-resolution scenes containing a lot of detail which we typically do not have in our scenario or setup, that is, in sports scenes. Efros et al. [9] also process soccer footage. Even though their work focuses more on action detection, they showed that even on low resolution data a rough 2D pose can be estimated.

Another major challenge in pose estimation are occlusions. If the footage comes from a single camera it is very difficult to resolve them. Using multiple cameras increases the probability to have an unoccluded view of the same subject. The higher the spatial coverage by cameras is, the fewer ambiguities remain. Moreover, sport broadcasts already use multiple cameras on the field. Therefore, we can leverage this information to compute a more accurate 3D pose estimation.

Most methods for multiple views 3D pose estimation use tracking algorithms to reconstruct the pose at time t from the pose at time t−1 [4]. The tracking can be done either using optical flow [4] or stereo matching [6]. These methods can provide very accurate pose estimation, but they generally work in a controlled environment, require a larger number of high-resolution cameras (usually at least four) and good spatial coverage of the scene (usually circular coverage) to resolve ambiguities due to occlusions.

Other methods [21, 8, 23] construct a proxy geometry either using multi-view silhouettes or multi-view stereo. The skeleton is then fitted into this geometry. These methods provide very good results, but impose restrictions on the setup. They require a carefully built studio setup, many high resolution cameras and very good spatial coverage.

Another class of algorithms is based on image analysis and segmentation [15, 10]. These algorithms use machine learning methods to discriminate between body parts. This analysis generally requires high resolution footage, which is not available in our setup.

SUMMARY

It is therefore an object of the invention to create a method and a system of the type mentioned initially which overcomes the disadvantages mentioned above.

These objects are achieved by a method and a system according to the corresponding independent claims.

The computer-implemented method for estimating a pose of an articulated object model, wherein the articulated object model is a computer based 3D model of a real world object observed by one or more source cameras, and the articulated object model represents a plurality of joints and of links that link the joints, and wherein the pose of the articulated object model is defined by the spatial location of the joints, comprises the steps of obtaining at least one sequence of source images from a video stream comprising a view of the real world object recorded by a source camera;

processing the source images of the at least one sequence to extract, for each image, a corresponding source image segment comprising the view of the real world object separated from the image background, thereby generating at least one sequence of source image segments;

maintaining, in a database in computer readable form, a set of sequences of reference silhouettes, each reference silhouette being associated with an articulated object model and with a particular reference pose of this articulated object model;

for each sequence of the at least one sequence of source image segments, matching this sequence with a plurality of sequences of reference silhouettes and determining one or more selected sequences of reference silhouettes which best match the sequence of source image segments;

wherein matching of the two sequences is done by matching each of the source image segments with the reference silhouette that is at the same position within its sequence, computing a matching error that indicates how closely they match, and computing from the matching errors of the source image segments a sequence matching error;

for each of these selected sequences of reference silhouettes, retrieving a reference pose that is associated with one of the reference silhouettes; and computing an estimate of the pose of the articulated object model from the retrieved reference pose or poses.

In an embodiment,
one image of the sequence of source images is designated a frame of interest, and the source image segment that is generated therefrom is designated a source image segment of interest;
the sequence matching error is a weighted sum of the matching errors of the match of the two sequences;
the weight of the matching error for the source image segment of interest is largest and decreases with the distance of the source image segments (within the sequence) from the source image segment of interest; and
the reference pose is retrieved for the reference silhouette that was matched with the source image segment of interest.

The result of these steps is an initial pose estimate, which then can be used in further steps, for example, for maintaining local consistency between pose estimates from consecutive frames, and global consistency over a longer sequence of frames.

In summary and in other words, finding this initial estimate, that is, the best match or matches for a sequence of source image segments, can be done by
repeatedly choosing, from the set of sequences of reference silhouettes, a current sequence of reference silhouettes, and comparing the at least one sequence of source image segments to this current sequence of reference silhouettes by
pairwise comparing each source image segment with a corresponding reference silhouette and computing a matching error that indicates how closely they match;
for one of the source image segments, coming from a frame of interest, computing a sequence matching error taking into account the matching errors of two or more adjacent source image segments;
selecting, from the set of sequences of reference silhouettes, a predetermined number of sequences which have the smallest sequence matching errors;
for each of these selected sequences of reference silhouettes retrieving the reference pose that is associated with the reference silhouette which in turn corresponds to the frame of interest; and
computing an estimate of the pose of the articulated object model in the frame of interest from the retrieved reference poses.

Sequences of reference silhouettes can be stored as longer sequences and extracted from such longer sequences as sub-sequences. In other words, the source image segments can be compared to the longer reference sequence by sliding a window (or "filter window") having the length of the source image sequence along the longer reference sequence. For a given source image segment, the corresponding reference silhouette is the one that has the same position in the sequence or sub-sequence currently being compared to the source image segment.

The matching error, in an embodiment, is adapted or weighted according to a confidence value which indicates the quality of the source image segment. A source image segment that is known or likely to comprise overlapping real world objects is assigned a lower confidence value than one that comprises just one object. As a result, if e.g. the source image segment from the frame of interest comprises overlapping players, the corresponding pose error carries a smaller weight than the pose errors from source image segments adjacent in the sequence, and so the final pose estimate for the frame of interest is improved.

The number of selected sequences of reference silhouettes is set as a constant or can chosen by the user. Typically, it is two, but can be three or more as well.

In an embodiment, the step of computing the estimate of the pose of the articulated object model is based on at least two sequences of source images depicting views of the same scene taken from different viewpoints at the same time, and uses at least two best matches and correspondingly two retrieved reference pose per sequence of source images. The estimate of the pose is then computed by choosing a combination of retrieved reference poses that agree best in 3D space (Germann et al. [11]).

In an embodiment, the information from the silhouette that is used for matching corresponds only to the outline of a segment. This information can be represented, e.g., by a binary bitmap or by the coordinates of the outline or by a vector sequence defining the outline, or by any compressed version of such information. In all these cases, the silhouette information only defines, for each point of a frame, whether the point is inside or outside the silhouette. Correspondingly, the steps for matching a source image segment with a reference silhouette take only this outline information into account. This allows for an efficient implementation and fast processing. However, this does not rule out the use of texture information pertaining to the inside of the silhouette in further steps, e.g. when eliminating right/left ambiguities, optimizing estimated poses and sequences of poses, etc.

Consequently, in another embodiment, the silhouette information also comprises texture information pertaining to the inside of the silhouette, and the matching of source image segments with reference silhouettes also uses this texture information. For example, feature point or feature based descriptors can be used, or optical flow methods as in in Efros [9].

The terms "source image segment" and "reference silhouette" both describe the same type of information (be it just outline information, or also comprising e.g. texture information); the different terms have been chosen for legibility.

The camera setup providing image data for the present method is more flexible than traditional ones, but has to cope with severe restrictions: we are constrained by having only two to three cameras that are generally placed only on one side of the field, have very large baselines and imprecise calibrations (the calibration comprising intrinsic and extrinsic camera parameters describing the position and orientation of the camera relative to the scene being observed, and optical properties such as focal length, aperture etc. defining the projection from the scene to the camera image). Also, since the image generally covers a large part of the field, each individual player has a very low resolution. The closest to our approach is the method by Germann et al [11]. This method also uses a silhouette based database search to retrieve the 3D pose. However, it is based on a single frame only, without any consistency checking. Furthermore, the result only consists of poses already available in the database, which do often not correspond to the real pose. Therefore, the poses will be incorrect and manual correction usually is required for all poses in all views and all frames, making this approach very tedious and unfeasible for sequences. Our method however matches entire sequences instead of a single frame, insures consistency for the initial guess and employs a novel energy term to compute the final 3D pose, which may thus differ from the initial database pose.

In an embodiment, the following steps for establishing local consistency between two poses determined from at least one sequence of consecutive source image segments, each pose being associated with at least one source image segment (from at least one view) wherein elements, that is, joints and/or links, of the articulated object model in one or both of the poses correspond to limbs of the real world object that can be labeled in an ambiguous manner:

for each one of a pair of consecutive source image segments, determining, from the associated pose and for each one of the possible ambiguous labellings of each pose, a corresponding labeling, in the source image segment, of image points from limbs;

choosing, for a first one of the pair of consecutive source image segments, a labeling of the pose;

computing an optical flow between the first one and a second one of this pair of consecutive source image segments;

determining, from the optical flow, locations in the second image segment to which the image points corresponding to the limbs of the first image segment have moved, and labeling these locations in the second image segment according to the labeling of the limbs in the first image segment;

choosing, of the possible ambiguous labellings of the pose for the second image segment that were used to label the image points according to the pose, the labeling which is consistent with the labeling determined from the optical flow.

In an embodiment, the above steps are repeated, choosing other alternatives for labeling the pose for the first image segment. Then, the labeling of both the pose of the first and of the second image segment is chosen such that the labeling is consistent with the optical flow, resulting in an overall best labeling.

In a further embodiment, the above steps are repeated for the next pair of consecutive images. That is, the second image segment takes the place of the first one, and the next image segment takes the place of the second one. One consequence of this may be that a wrong labeling propagates through the sequence of matched poses. For this reason, a subsequent global review can be performed, ensuring global consistency by flipping (or, more generally, changing), if necessary, the labeling for the entire sequence.

The limbs that can be labeled ambiguously typically are pairs of limbs, but in a more general setting and with real world objects other than humans, can be sets of limbs with more than two members.

The computer-implemented method for optimizing an estimate of a pose of an articulated object model, wherein the articulated object model is a computer based 3D model of a real world object observed by one or more source cameras, and the articulated object model represents a plurality of joints and of links that link the joints, and wherein the pose of the articulated object model is defined by the spatial location of the joints, the method comprising the steps of given an estimate of the pose (or, more specific: joint positions) of the articulated object model and a set of source image segments each comprising a view of the real world object represented by the articulated object model observed at the same time from different viewpoints performing an optimization procedure in which the pose (or joint positions) of the articulated object model is varied in order to minimize an error function, wherein the error function comprises a model matching error which is computed over all views and penalizes poses whose joint positions, when projected into the views corresponding to the set of source image segments, do not match the source image segments.

This method for optimizing the estimate of a pose can be performed on an estimate as found by the method for estimating a pose as initially described, or can be implemented as a stand-alone procedure or system which starts out with an estimate determined by other means.

In an embodiment, the computer program product for the method for estimating a pose of an articulated object model and/or for optimizing an estimate of a pose of an articulated object model is loadable into an internal memory of a digital computer or a computer system, and comprises computer-executable instructions to cause one or more processors of the computer or computer system execute the method for estimating a pose of an articulated object model and/or for optimizing an estimate of a pose of an articulated object model. In another embodiment, the computer program product comprises a computer readable medium having the computer-executable instructions recorded thereon. The computer readable medium preferably is non-transitory; that is, tangible. In still another embodiment, the computer program is embodied as a reproducible computer-readable signal, and thus can be transmitted in the form of such a signal.

Further embodiments are evident from the dependent patent claims. Features of the method claims may be combined with features of the system claims and vice versa.

BRIEF DESCRIPTION OF THE DRAWINGS

The subject matter of the invention will be explained in more detail in the following text with reference to exemplary embodiments which are illustrated in the attached drawings, which show:

FIG. 1 schematically an overview over a real world scene;

FIG. 2 an articulated object model;

FIG. 3a typical silhouette in a segmented image;

FIG. 3b three best matching poses from a database;

FIG. 4 estimated poses in a soccer game with a projection of 3D skeletons into a source camera;

FIG. 5 schematically shows an overview of the method;

FIG. 6 2D pose estimation according to the prior art and according to the present method:

Figure 7:
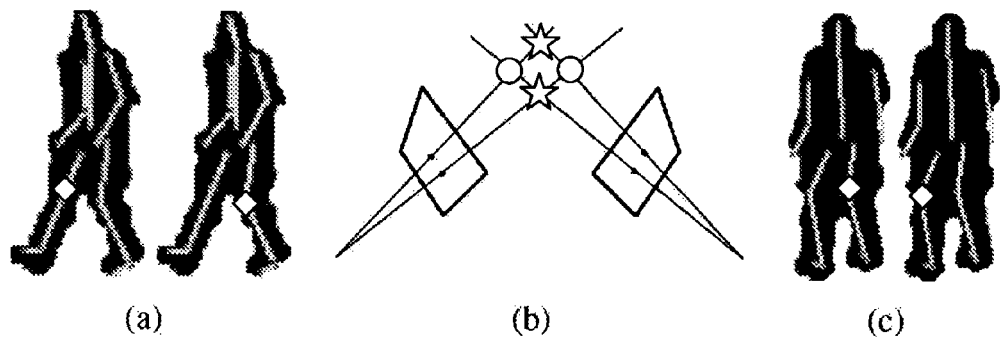
FIG. 7 an example for pose ambiguities.

Image data is courtesy of Teleclub and LiberoVision.

In principle, identical elements are provided with the same reference symbols in the figures.

DETAILED DESCRIPTION

We focus on pose estimation based on unconstrained football broadcast footage. This implies several challenges to camera positions, object size and temporal coherence. Although, the pose estimation can be computed based on a multi-camera setup, there are only few cameras available, which additionally feature wide baselines. Moreover, the cameras are typically placed only on one side of the field providing limited coverage of the scene. The cameras provide high resolution images, but are usually set to be wide-angle for editorial reasons. Therefore, players typically cover only a height between 50 and 200 pixels. Furthermore, the motion of the players can be very complex and, especially in contact sports like football, there is a lot of occlusion.

We present a data-driven pose estimation method that can operate in an uncontrolled environment with loosely calibrated cameras, low resolution players and in presence of occlusions. The resulting method and system can use as little as only two cameras to estimate the pose. No restricting assumption is made on the family of possible poses or motions. By using temporal coherence for the initial pose estimation as well as pose refinement, user interaction is limited to a few clicks for inverting arms and legs in failure cases.

Many of the state of the art methods in pose estimation rely on tracking or segmenting the image in 2D and using calibration information to extrapolate the skeleton to 3D [4, 20]. These approaches work well for high resolution footage, but due to lack of information, they often fail on low resolution images and are sensitive to external lighting conditions. Our method works in completely uncontrolled outdoor setups with low resolutions, since it only relies on coarse silhouettes and coarse calibrations.

Similar to Germann et al. we use a database of poses and silhouette comparison to extract pose candidates in 2D and use camera calibration information to compute the corresponding 3D skeleton. In contrast to their method, we first perform a novel time consistent silhouette based search in the database to extract the closest database candidate with temporal coherence. An additionally applied novel time consistency step leads to the initial pose estimation. Because the exact real pose is generally not in the database, this will only result in a closest match, but not in an accurate pose. Therefore, we developed a novel space-time optimization technique that leverages the temporal information to automatically compute the accurate 3D pose.

Contributions are:
A time consistent silhouette based database pose look-up providing an initial pose estimation
Local and global consistency check to improve initial pose estimation
A space-time pose optimization based on novel constraints Instead of learning a statistical model for the skeleton, our method directly uses a database of poses. This has two advantages. Firstly, such a data-driven method allows to easily add new pose sequences to adapt to new setups or previously unknown poses. Secondly, there is less statistical bias to more common poses, since the method simply searches for the closest pose in the database. Using a database with anthropometrically correct data will always result in a plausible pose for the initial estimation.

3. Overview

FIG. 1 schematically shows an overview over a real world scene 8, the scene 8 comprising a real world object 14 such as a human, being observed by two or more source cameras 9, 9', each of which generates a video stream of source images 10, 10'. The system and method according to the invention generates a virtual image 12 showing the scene 8 from a viewpoint of a virtual camera 11 which is distinct from the viewpoints of the source cameras 9, 9'. Optionally, from a sequence of virtual images 12 a virtual video stream is generated. An apparatus according to the invention comprises a processing unit 15 which performs the image processing computations implementing the inventive method, given the source images 10, 10' and generating one or more virtual images 12. The processing unit 15 is configured to interact with a storage unit 16 for storing source images 10, virtual images 12 and intermediate results. The processing unit 15 is controlled by means of a workstation 19 typically comprising a display device, a data entry device such as a keyboard and a pointing device such as a mouse. The processing unit 15 may be configured to supply a virtual video stream to a TV broadcasting transmitter 17 and/or to video display devices 18.

FIG. 2 schematically shows a 3D model 1 of the scene 8, comprising an articulated object model 4 of the real world object 14. The 3D model 1 typically further comprises other object models, e.g. representing other humans, the ground, buildings etc (not shown). The articulated object model 4 comprises joints 2 that are connected by links 3, roughly corresponding to bones or limbs in the case of the model of a human. Each joint 2 is defined as a point in 3D-space, and each link 3 can be represented by a straight line connecting two joints 2 through 3D-space. Based on the pose, the 3D shape of a mesh model, or of another model representation of the 3D shape of the real world object, of the object can be computed and its projection into the 2D images seen by the source cameras 9,9'. This allows to check and improve poses. Whereas the pose is described by one-dimensional links, limbs represented by the (mesh) model and placed according to the pose, extend in three dimensions. Although the present application is explained in terms of modelled human shapes, the application to animal shapes or to artificial structures such as robots is covered as well.

First, for the 2D pose estimation in each individual input view, we utilize a database of silhouettes. We assume that a coarse segmentation of the subject 14 from the background is available, e.g., using chroma keying or background subtraction. FIG. 3a shows a typical example of a segmented image 13 in our application scenario. The basic idea to compute an initial guess of a subject's pose, i.e., the 2D positions of the skeleton joints 2, is to compare it to a database of silhouettes, for which the respective skeleton poses are known. See FIG. 3b with different reference silhouettes 13', two of them are reproduced at a smaller scale to save space.

FIG. 4 shows an example for one frame from a sequence of source images from a soccer scene, with 3D poses found by the method projected into the image and superimposed on the players.

The method, in an embodiment, comprises two steps as illustrated in FIG. 5. In the first step 62, given coarse calibrations and silhouettes 61 and reference silhouettes from a pose database 66, the method extracts 2D poses for each individual camera view using a spatial-temporal silhouette matching technique, yielding a triangulated 3D pose guess 63 (labeled "Estimated 3D body pose"). This pose detection is inherently prone to ambiguities, namely left right flips of symmetrical parts. Although the skeleton matches the silhouettes quite well, the arms or legs of the player can still be flipped. Due to occlusions and low resolution, these ambiguities are sometimes very difficult to spot even for the human eye. Therefore, we employ an optical flow based technique to detect the cases where flips occur, and correct them to obtain a consistent sequence. It is important to note that optical flow is in such setups not reliable enough for tracking the entire motion of a players body parts over an entire sequence, but it can be used for local comparisons as shown by Efros et al. [9]. The first step uses a sequence 51 of source image segments 13, matching this sequence 51 with a plurality of sequences 52 of reference silhouettes 13', focusing on an image frame 56 of interest.

However, in general, no pose from the database will match the actual pose exactly. As a consequence, in the second part or step 64 (labeled "Space-time pose optimization") of the method, this initial 3D pose 63 is refined by an optimization procedure 64, which is based on spatio-temporal constraints. The resulting optimized 3D skeleton 65 (labeled "Optimized 3D body pose") matches the silhouettes from all views and features temporal consistency over consecutive frames.

4. Initial Pose Estimation

The initial pose estimation is computed by first retrieving the 2D pose from each player and each camera view using a novel space-time data-driven silhouette based search. Once we find the 2D poses for every player in every camera, we can use the calibration information from the cameras to place the 2D joint positions, as observed in the images, in 3D space (this step is also called "lifting the 2D positions in 3D"). We compute the 3D location of each joint by intersecting the rays corresponding to each 2D joint in each camera view. The rays will not intersect exactly, therefore we choose the closest point to these rays in least-squares sense. From this we get a triangulation error $E_t$ and an initial camera shift as described by Germann et al. [11].

We represent the 3D skeleton of a pose S in angle space in the following way: Every bone i is represented relative to its parent bone using two angles $\alpha_i$ and $\beta_i$ as well as the length $l_i$ of the bone. The root bone is defined by its orientation given by three angles $\alpha_0, \beta_0, \gamma_0$ and by a global position $p_0$. The joint positions j, in the 3D Euclidian space can easily be computed from this angle space representation and vice-versa (taking into account gimbal lock).

4.1. Pose Database Construction

A large database that samples the entire range of human motion is important for our method and is very difficult to create manually. Therefore, we use the CMU motion capture database [7]. A template mesh rigged with the same skeleton is deformed using linear blend skinning to match the pose of the database pose. From this, virtual snapshots are taken and the silhouette is extracted. This way we created a database of around 20000 silhouettes.

Unfortunately, the CMU database has only a limited number of types of poses, mostly from running and walking sequences. Therefore, we manually added a set of 900 silhouettes from several soccer scenes. This is significantly fewer than the ones generated automatically, but enough to enlarge the span of example poses to obtain good results. It is important to note that the added example poses were not taken from the same sequences as we used to fit the poses. The database can continuously be enlarged by new generated poses, resulting in a better initial pose estimation.

4.2. 2D Pose Estimation

Similar to Germann et al. [11] we accept as an input a coarse binary silhouette mask for each player as well as coarse camera calibrations. We compare these silhouettes against the silhouettes from the database using the technique presented by Germann et al. that computes the quality of a match between the input silhouette and a database silhouette on a fixed raster size (a grid with a height=40 and a width=32 pixels) that is fitted to the segmentation.

The silhouette extraction extends the method presented by Germann et al. by leveraging temporal information. Instead of relying on a single frame matching, our approach considers a weighted sum of differences between source image segments 13 and reference silhouettes 13' over a sequence of image frames. A resulting pixel error $E_q(s)$ of the binary input silhouette image I with index t (from the image frame 56 of interest) when comparing it to the silhouette image $I'_s$ with index s from the database is computed as follows:

$$E_q(s) = \sum_{i \in \{\frac{-n}{2},\dots,\frac{n}{2}\}} \theta_s(i) \frac{1}{|P|} \sum_{p \in P} |I_{t+i}(p) - I'_{s+i}(p)|. \quad (1)$$

wherein n is the filter window size, that is, the number of frames preceding and following the frame of interest 56 that are considered, and P is the set of all raster positions where the corresponding pixel is in both images not possibly occluded, i.e., is not expected to be part of another players silhouette. |P| denotes the number of raster positions in P. A raster position can correspond to an actual hardware pixel from the camera, or to a pixel from a scaled image computed from the camera image.

The weights $\theta_s(i)$ describe a normalized Gaussian function 53 with the center around s. For $I'_{s+i}(p)$ not included in the database, $\theta_s(i)$ is set to 0 before the normalization. Comparing sequences instead of single images does not only add temporal coherence resulting in smooth motions, but also improves pose estimation. Even image parts occluded over a few frames can be fitted more robustly. In general, this approach helps to prevent matching a silhouette that is similar but originated from a completely different pose. This is depicted in FIG. 6, which also shows a direct comparison of our initial pose estimation to the pose estimation in the work of Germann et al. FIG. 6 shows: (a) Estimated 2D pose by comparing just the current frame to the database as in Germann et al. [11]. (b) The found database item for the single frame comparison. (c) Estimated 2D pose by comparing sequences of silhouettes. (d) The found database sequence with the corresponding image segment in the middle.

Using this pixel error, we search for each camera view for the best two pose hypotheses and select the best combination of those by choosing the lowest resulting triangulation error $E_t$. Of course, in alternative embodiments, more than two pose hypotheses from each camera can be used in order to determine the best combination, or a different number per camera, or only one pose hypothesis from at least one camera, assuming it to be the best without considering the triangulation error.

4.3. Pose Consistency

FIG. 7 shows an example of pose ambiguities: (a) Possible labellings in first camera. (b) Schematic view from the top to illustrate the two possible positions of the knees. (c) Possible labellings in the second camera.

The 2D pose detection step relies on silhouette matching, and therefore is prone to ambiguities. Given a silhouette and a matching initial 2D pose retrieved from the database, we can not decide if the labellings as "left" and "right" in arms and legs are correct. For this reason, in an embodiment, information from retrieved database pose which defines whether a leg or an arm (or, in the general case, one of a set of symmetric chains of joints) is to be labeled e.g. "left" or "right" is ignored after a match of a 2D silhouette. The remaining ambiguity is resolved as follows. FIG. 7(a) shows an example silhouette with two possible labellings for the legs. The possible position of the right knee is marked by a diamond shape. This view is from the left camera in the schema in FIG. 7b). The same subject in the same frame but in the other camera shows the silhouette in FIG. 7(c), again with the two possible labellings of the legs. Therefore we have four possible positions in 3D for the right knee after lifting into 3D. They are shown in FIG. 7(b). If the right knee falls on one of the positions marked with a star, the left knee will fall on the other star. If the right knee falls on one of the positions marked with a circle, then the left knee will fall onto the other circle. Let the circles be the correct positions of the knees, then we can have two different types of failure: either the knees are just wrongly labeled in 3D but at the correct positions, or the knees are at wrong positions (the stars).

Without additional information we cannot decide in such a situation which positions are correct, i.e., select the only correct one from the four possibilities—especially when only two cameras are available. A possible approach to disambiguate the flipped cases would comprise checking all possible combinations and keep only the anatomically possible ones. However, it is still possible that several configurations of flips yield anatomically correct poses.

To correctly solve these ambiguities, we use a two step approach: first, the local consistency between each pair of consecutive 2D frames is established, resulting in an entire sequence of 2D poses being temporally consistent. Second, any remaining ambiguities that run through this entire sequence are resolved globally.

4.3.1 Local Consistency

The goal of this step is to make sure that the 2D poses recovered from a camera at frames k (FIGS. 8(a) and 8(b)) and k+1 (FIG. 8(c)) are consistent, i.e., that no right/left flips of arms or legs occur between consecutive frames. In other words, if a pixel at frame k belongs to the right leg, it should belong to the same leg in the frame k+1 as well. Applying this assumption, we assign to each pixel in both color images $I_{c(k)}$ and $I_{c(k+1)}$ a corresponding bone, and we compute the optical flow [5] (FIG. 8(d)) between the frames.

Figure 8:
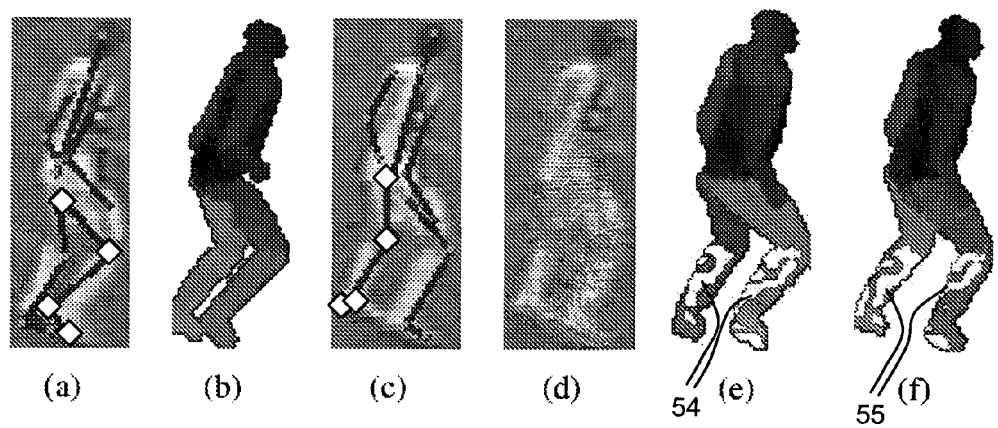
FIG. 8 an illustration of local consistency.

FIG. 8 illustrates how local consistency is established by means of a model based consistency check. In this embodiment, the model is a mesh based model, but the method can be performed with another representation of the 3D shape of the real world object as well. Joints assigned to the right leg are marked with diamonds: (a) Previous frame and (b) fitted mesh. (c) Wrongly assigned legs in current frame. (d) Optical flow. (e) Fitted mesh in current frame with correct and wrong matches labeled. (f) Error of the flipped (correct) legs in the current frame. In (e) and (f), the irregular white shapes on the lower legs and feet indicate pixels that have been labeled as wrong 54 in (e) and as correct 55 in (f). By chance there are no "correct" pixels visible in (e) and no "wrong" pixels in (f), but there could be.

The underlying idea is that a pixel in frame k and its corresponding pixel in frame k+1, computed using optical flow, should be assigned to the same bone. Otherwise there could be a flip as shown in FIG. 8(c). Therefore, we compute this association for all combinations of possible labellings of joints as being left or right (see FIG. 7), compute the consistency of the pixel flows with each of the combinations, and select the most consistent label combination for the second frame. To make the approach more robust in respect to optical flow errors, we only consider pixels with good optical flow and where the corresponding pixel labels in both frames are of the same bone type, i.e., either both arms or both legs. For instance, if a pixel p belongs to the left arm in frame k and to the torso in frame k+1, this is most likely due to an inaccurate optical flow based on occlusion and we can thus omit this pixel from consideration. If the pixel belongs to a different bone of the same type (arm or leg), then this is a strong indication of a flip. We employ a voting strategy to select the optimal flip configuration: a limb is labeled "left" or "right" according to whether it comprises a majority of "left" or "right" pixels.

To do this, each pixel has to be assigned to its corresponding bone. A naive assignment based on the distance to the bone is not optimal, since it does not take into account occlusions. Therefore, we construct the 3D pose using the information from all the cameras as described in the section on initial pose estimation. Again, we use a template mesh deformed and rendered for all possible flips in all cameras using color coding for all the bones. The rendered mesh carries, for each limb, the information whether it is "left" or "right". Thus, the pixel assignment is a simple lookup providing an accurate assignment despite of self occlusion: For each pixel, the rendered mesh at the same position indicates whether the pixel is "left" or "right".

Comparing this labeling with the labeling determined from the optical flow allows the pixels to be labeled as "right" or "wrong", depending on whether the labeling is consistent. FIG. 8(e) shows an initial wrong labeling which causes certain leg areas, shown as white in (e), to be marked as "wrong". The correct labeling causes other leg areas, shown as white in (f), to be marked as "wrong".

This resolves most of the flips of arms or legs. For failure cases, the user can change the flipping for all subsequent frames of a sequence with one mouse-click. This is the only user interaction in our system and for a view of a player takes only about 1 click per 10 frames.

4.3.2 Global Consistency

After the local consistency step, all consecutive frames should not have flips between them which means that the entire sequence is consistent. There is still the possibility that the entire sequence is flipped the wrong way. However, this is a simple problem as we only have a binary disambiguation to make for the entire sequence. Therefore, the global consistency is checked by evaluating a function of the possible global labellings of the arms and the possible global labellings of the legs. The final labeling is selected by choosing the labeling combination that minimizes the following error term, summed over the entire sequence:

$$E_g = \lambda_{DB} E_{DB} + \lambda_t E_t \qquad (2)$$

This is a weighted sum with constant parameters $\lambda_{DB}$ and $\lambda_t$. $E_{DB}$ is a "distance to database" which ensures that the selected labeling/flipping results in plausible poses along the sequence. It penalizes a pose for the distance to the closest pose P in the database:

$$E_{DB} = \min_P \frac{1}{2|J|} \sum_{i=0}^{|J|} (\alpha'_i - \alpha_i)^2 + (\beta'_i - \beta_i)^2 \qquad (3)$$

where $\alpha$ and $\beta$ are the joint angles of the triangulated joint positions J. $\alpha'$ and $\beta'$ are the ones of the database pose P. $|J|$ is the number of joints. When searching for the closest database pose for each pose along the sequence, the labeling (right/left) of the poses in the database is taken into account. That is, limbs from the poses of the sequence are only matched to limbs of the database poses that are labeled the same. Since the database contains only anthropometrically correct poses, this penalizes for non-plausible poses.

5. Pose Optimization

The best 3D poses computed by the pose estimation so far are still limited to fit, in each view, to a pose that exists in the database. However, the database comprises only a subset of all possible poses and therefore often does not contain the accurate solution.

Figure 9:
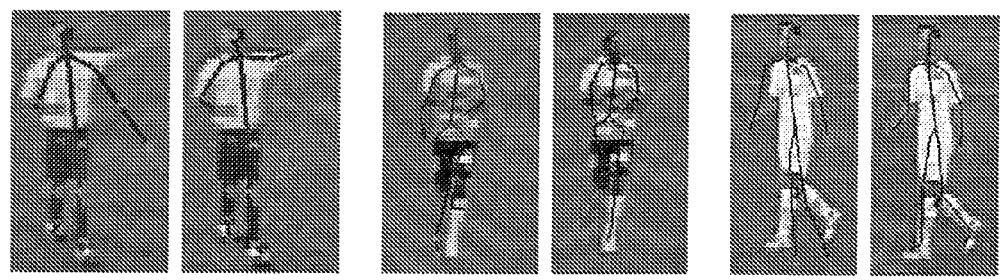
FIG. 9 an estimated pose before and after pose optimization.

For this reason, a optimization method is applied to retrieve a more accurate pose, as shown in FIG. 9. To guide this optimization method, we combine several spatial and temporal energy functions and minimize them using an optimization method.

5.1. Energy Function (or Error Function)

The energy function or error function is based on our representation of the skeleton S described in the section on initial pose estimation. All the parameters except the bone length are variable per frame. The bone lengths are also variable but stay the same over the entire sequence and are initialized as the average of the local lengths of all frames.

This automatically introduces an anthropometric constraint, since bones should not shrink or grow over time. Another nice property of the chosen skeleton representation is that it significantly reduces the number of variables. In order to cope with calibration errors, we also optimize for the a dimensional shift vector given per subject, camera and frame.

We define our energy or error functional per frame and subject as the following weighted sum of error terms:

$$E(S) = \omega_s E_s + \omega_f E_f + \omega_{DB} E_{DB} + \omega_{rot} E_{rot} + \omega_p E_p + \quad (4)$$

Not all the error terms are required in order for the optimization to return useful results. According to the nature of the scene and the real world objects, one or more of the error terms may be omitted. In an embodiment, in order to observe sports scenes, at least the silhouette filling error and optionally the distance to database error are used.

The error functional can be minimized in a local optimization in which the pose of the subject as seen in one frame or in a set of frames from the same instant in time is varied. Alternatively, the error functional can be minimized over a longer sequence of frames in which the poses corresponding to all frames are varied in order to find optimal matches for the entire sequence which are consistent which each other (according to optimization criteria that link consecutive frames).

Silhouette matching error term $E_s$ The bones of the correct 3D skeleton should project onto the 2D silhouette in all cameras. The error term $E_s$ penalizes the joint positions whose 2D projections are outside the silhouettes:

$$E_s = \frac{1}{|C||J_+|} \sum_{c \in C} \sum_{j \in J_+} EDT_c(P_c(j)), \quad (5)$$

where C is the set of all cameras that cover a silhouette of this subject. $J_+$ is the union of the set J of all joints and the points that lie in the middle of a bone, or one or more other points placed along the bone. The normalized Euclidean distance transform EDT returns for every 2D point in the camera image the distance to the closest point inside the silhouette divided by the larger side of the silhouettes bounding box. This normalization is important to make the error independent of the size of the subject in the camera image which may vary according to the zoom. $P_c(j)$ is the projection to transform the 3D joint j into camera space taking into account the camera shift as in [11], in order to correct for small calibration errors.

Silhouette filling error term $E_f$ Although the silhouette matching term $E_s$ penalizes joints outside the silhouette, there is so far no restriction on where they are placed inside the silhouette. The filling error term $E_f$ prevents the joints from being located close to one another somewhere inside the torso, and thus, in other words, ensures that there are joints located in all the extremities:

$$E_f = \frac{1}{|C||J||R|} \sum_{c \in C} \min_{j \in J} \sum_{r \in R} dist(P_c^{-1}(r), j), \quad (6)$$

where R is the set of all grid points from the section on 2D pose estimation that lie inside the silhouette. $P_c^{-1}(r)$ transforms such a grid point from camera space of camera c into a ray in world space while dist ( ) is the distance of a ray to a joint.

The intention of this error term is to penalize poses in which the elements of the articulated object model (in this case, joints and links, or only links) are collapsed inside the silhouette. The error term favors poses in which each raster point or grid point inside the silhouette is close to such an element. In other words, with increasing distance of a point from the closest element, the silhouette filling error term increases. The closest element can be a link or a joint or both.

Distance to database pose error term $E_{DB}$ This was already defined by equation 3. It ensures that the final 3D pose is kinematically possible (e.g., the knee joint bends the right way) by taking into advantage the database of correct poses. It implicitly adds anthropometric constraints to our optimization. The closest database pose used here is found by a new search through the poses, since the estimated pose may have changed in the course of the optimization process.

Smoothness error terms $E_{rot}$ and $E_p$ Human motion is generally smooth such that the skeletons of adjacent frames should be similar. This enables us to introduce temporal coherence to the pose optimization. Therefore, $E_{rot}$ penalizes large changes of the internal angles of the skeleton of consecutive frames and $E_p$ penalizes large motion:

$$E_{rot} = \frac{1}{2|J|} \sum_{i=0}^{|J|} (\alpha_i' - \alpha_i)^2 + (\beta_i' - \beta_i)^2 \quad (7)$$

$$E_p = |p_0 - p_0'| \quad (8)$$

where $\alpha'$ and are the corresponding angles of the same subject in the previous frame and $p'_o$ is the global position of the root joint in the previous frame. The rotation of the root bone can be taken into account and constrained in a similar manner.

Length error term $E_l$ The initialization of the bone lengths (or link lengths) is already a good approximation, when handling a sequence of frames. Therefore, we try to keep the optimized pose close to these lengths:

$$E_l = \frac{1}{|J|} \sum_{i=0}^{|J|} (l_i - \hat{l}_i)^2 \quad (9)$$

where $l_i$ is the final bone length and $\hat{l}_i$ is the initial bone or link length or another reference bone or link length. In another embodiment, $\hat{l}_i$ can be considered to be the true bone length and is made variable as well, and can be estimated when performing an optimization over the entire sequences of frames.

5.2. The Optimization Procedure

To minimize the energy term in equation 4, we employ, for example, a local optimization strategy where we iteratively optimize the variables one by one by performing line search along randomly picked directions [19]. For each variable we select 10 random directions for optimization and we perform 20 global iterations. Due to the inherent non-smooth nature of our objective functions, this method performed better in practice than Levenberg-Marquardt [16].

The optimization procedure can be implemented independently from the initial pose estimation procedure described above, that is, with any other pose estimation procedure or with constant default poses as initial estimates. However, using the initial pose estimation procedure, which provides a rather good initial estimate, ensures that the optimization procedure is likely to find a globally optimal match, avoiding local minima of the error function.

FIG. 9 illustrates the effect of the optimization procedure. The leftmost example shows the influence of the silhouette filling error term: The arm of the player can be brought up or down to reduce the silhouette matching error term, but the silhouette filling error term is only reduced when moving the arm up. FIG. 9 shows a clear improvement over the method by Germann et al. [11] which did not include a pose optimization at all and where each pose had to be corrected manually.

6. Results

We evaluated our system on four sequences of TV-footage from real soccer games with two or three cameras, yielding roughly 1500 poses to process. A subset of the results are shown in FIGS. 4 and 11.

Figure 11:
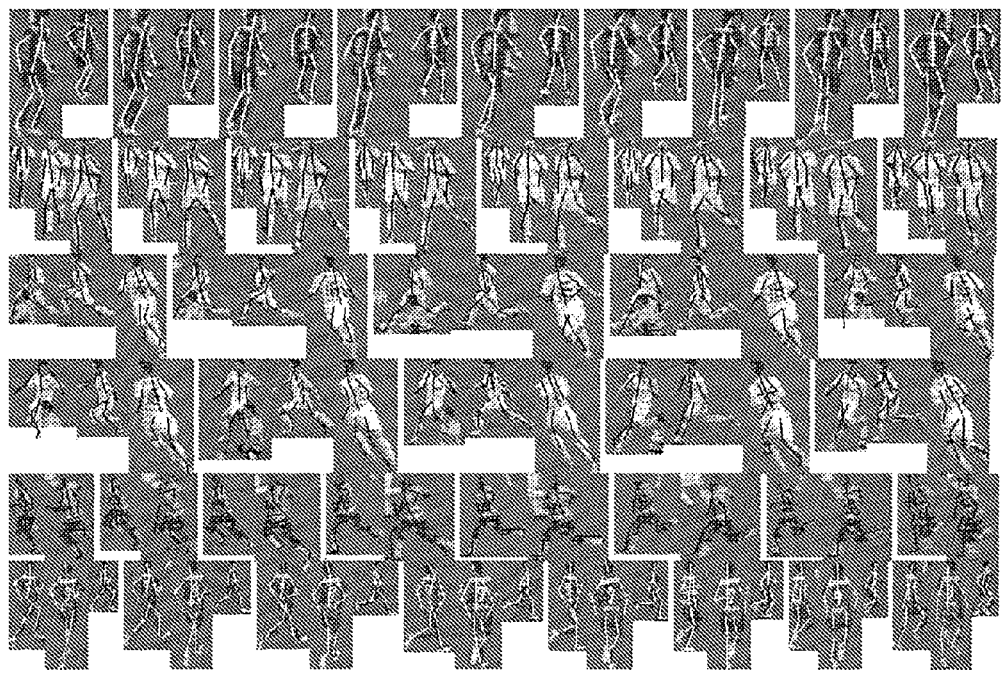
FIG. 11 result sequences with all camera views shown per frame.

Each row in FIG. 11 shows a set of consecutive poses and each item shows the image of the respective player in all the available cameras. Even with only two cameras and very low resolution images, our method can retrieve good poses in most cases.

The parameter values that we used for all our results, computed using our automatic parameter tuning system, are

| | | | Param. | | | | |
|---|---|---|---|---|---|---|---|
| $\omega_s$ | $\omega_f$ | $\omega_{db}$ | $\omega_{rot}$ | $\omega_p$ | $\omega_l$ | $\lambda_{DB}$ | $\lambda_t$ |
| 9 | 15 | 0.05 | 0.1 | 1 | 1 | 0.15 | 0.3 |

For the optimization functions in equations (4) and (2) we used the parameters shown in table 1 for all our results. They were found by the following parameter tuning procedure. We annotated manually the 2D poses in two scenes. Then the method was run and the results were automatically compared with the manual annotations. Using this as an error function and the parameters as variables allows for an automatic parameter optimization.

Our pose estimation method takes about 40 seconds per player per frame in a two camera setup and about 60 seconds for a three camera setup. We implemented a parallel version that runs a thread for every player. On an 8 core system this gave a speedup of roughly a factor of 8.

Note that the initial pose estimation does not depend on the pose estimation of the previous frame. Thus, there is no drift and the process can recover from bad pose guesses.

Figure 10:
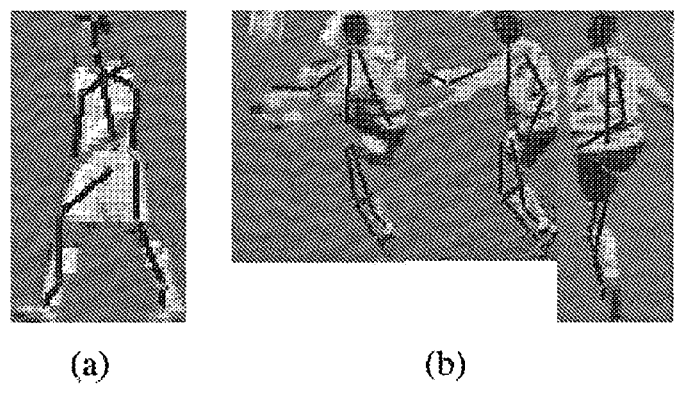
FIG. 10 failure cases.

FIG. 10 shows failure cases for the method described so far: (a) A pose that is too far from the database and could not be estimated correctly. (b) arms are too close to the body and could not be positioned correctly.

FIG. 11 shows result sequences with all camera views shown per frame.

Extension using Optical Flow

The method as described so far can fail due to the lack of information provided by a binary silhouette only, particularly when the arms are too close to the body as illustrated in FIG. 10(b). I.e., several poses can have very similar binary silhouettes. Thus, only using silhouette information may not be sufficient to disambiguate the poses. Incorporating optical flow into the optimization procedure can resolve such ambiguities. In more detail, this is done by determining the optical flow between two successive images, and determining therefrom, for one or more bones or joints, their expected position. This can be done for all joints, or only for joints that occlude (or are occluded by) other body parts. For example, given the position of joints (or bone positions and orientations) in one frame, optical flow to an adjacent frame is used to compute expected positions in the adjacent frame.

However, the optical flow is most reliable if the body part is not occluded in this camera. Thus, in another embodiment, similar to the method described above, a mesh rendered from the camera view is used to label every pixel with the body part it belongs too. Then, for propagating the position of a joint into the next frame, only the optical flow of those pixels near (or on) the projected joint position are used that belong to the corresponding body part of this joint.

Given, for each available camera, these expected positions, the expected joint position(s) are computed by triangulation. The distance, also called flow error term, $E_{EX}$ to the corresponding expected pose (taking into account the complete body or only the limb or the bone of interest is computed in essentially the same manner as the distance to database $E_{DB}$, and a corresponding weighted term $\omega_E E_{EX}$ is added to the energy function of equation (4).

Automatic Database Updating

Furthermore, the results of our method greatly depend on the pose database. A good database will have a wide range of motions as well as a wide range of views such that the initial guess is close to the correct pose. FIG. 10(a) shows an example where there is no similar pose in the database and thus the pose estimation fails. Good poses can be selected manually or automatically and then be added to the database, enlarging the space of possible poses.

Using Joint Angle Constraints

Another important prior that can be leveraged further is the kinematic information of the human skeleton: The method as presented so far already uses some implicit anthropometric constraints. However, specific constraints on joint angles, that is, accounting for the fact that joint angles of the human body are limited to a certain range of values, can be incorporated in the optimization of pose.

While the invention has been described in present embodiments, it is distinctly understood that the invention is not limited thereto, but may be otherwise variously embodied and practised.

REFERENCES

[1] A. Agarwal and B. Triggs. Recovering 3d human pose from monocular images. PAMI, 2006.
[2] M. Andriluka, S. Roth, and B. Schiele. Pictorial Structures Revisited: People Detection and Articulated Pose Estimation. CVPR, 2009.
[3] M. Andriluka and S. R. B. Schiele. Monocular 3d pose estimation and tracking by detection. ECCV, 2010.
[4] L. Ballan and G. M. Cortelazzo. Marker-less motion capture of skinned models in a four camera set-up using optical flow and silhouettes. In 3DPVT, 2008.
[5] J.-Y. Bouguet. Pyramidal implementation of the lucas kanade feature tracker: Description of the algorithm. Technical report, Intel Corp., Micropr. Research Labs, 1999.
[6] C. Choi, S.-M. Baek, and S. Lee. Real-time 3d object pose estimation and tracking for natural landmark based visual servo. In IROS, 2008.
[7] C. G. L. M. Database, 2010. http://mocap.cs.cmu.edu.
[8] E. de Aguiar, C. Stoll, C. Theobalt, N. Ahmed, H.-P. Seidel, and S. Thrun. Performance capture from sparse multi-view video. In SIGGRAPH, 2008.
[9] A. A. Efros, A. C. Berg, G. Mori, and J. Malik. Recognizing action at a distance. In ICCV, 2003.
[10] V. Ferrari, M. Marin-Jimenez, and A. Zisserman. Progressive search space reduction for human pose estimation. In CVPR, 2008.

[11] M. Germann, A. Hornung, R. Keiser, R. Ziegler, S. Warmlin, and M. Gross. Articulated billboards for video-based rendering. Eurographics, 2010.
[12] Kinect, 2010. http://www.xbox.com/en-US/kinect.
[13] T. B. Moeslund and E. Granum. A survey of computer vision-based human motion capture. CVIU, 2001.
[14] T. B. Moeslund, A. Hilton, and V. Krüger. A survey of advances in vision-based human motion capture and analysis. CVIU, 2006.
[15] G. Mori. Guiding model search using segmentation. In ICCV, 2005.
[16] J. Mor. The levenberg-marquardt algorithm: Implementation and theory. In Lecture Notes in Mathematics, volume 630. 1978.
[17] D. Ramanan, D. Forsyth, and A. Zisserman. Strike a pose: tracking people by finding stylized poses. In CVPR, 2005.
[18] D. Ramanan, D. Forsyth, and A. Zisserman. Tracking people by learning their appearance. PAMI, 2007.
[19] J. Schreiner, A. Asirvatham, E. Praun, and H. Hoppe. Inter-surface mapping. In SIGGRAPH, 2004.
[20] A. Shahrokni, T. Drummond, and P. Fua. Markov-based Silhouette Extraction for Three-Dimensional Body Tracking in Presence of Cluttered Background. In BMVC, 2004.
[21] C. Theobalt, E. de Aguiar, M. A. Magnor, H. Theisel, and H.-P. Seidel. Marker-free kinematic skeleton estimation from sequences of volume data. In VRST, 2004.
[22] Vicon, 2010. http://www.vicon.com.
[23] D. Vlasic, I. Baran, W. Matusik, and J. Popović. Articulated mesh animation from multi-view silhouettes. In SIGGRAPH, 2008.
[24] B. Zou, S. Chen, C. Shi, and U. M. Providence. Automatic reconstruction of 3d human motion pose from uncalibrated monocular video sequences based on markerless human motion tracking. Pattern Recognition, 2009.

The invention claimed is:

1. A computer-implemented method for estimating a pose of an articulated object model (4), wherein the articulated object model (4) is a computer based 3D model (1) of a real world object (14) observed by one or more source cameras (9), and the articulated object model (4) represents a plurality of joints (2) and of links (3) that link the joints (2), and wherein the pose of the articulated object model (4) is defined by the spatial location of the joints (2), the method comprising the steps of obtaining at least one sequence of source images (10) from a video stream comprising a view of the real world object (14) recorded by a source camera (9);

processing the source images of the at least one sequence (10) to extract, for each image, a corresponding source image segment (13) comprising the view of the real world object (14) separated from the image background, thereby generating at least one sequence (51) of source image segments (13);

maintaining, in a database in computer readable form, a set of sequences (52) of reference silhouettes (13'), each reference silhouette (13') being associated with an articulated object model (4) and with a particular reference pose of this articulated object model (4);

for each sequence (51) of the at least one sequence of source image segments (13), matching this sequence (51) with a plurality of sequences (52) of reference silhouettes (13') and determining one or more selected sequences of reference silhouettes (13') which best match the sequence (51) of source image segments (13); wherein matching of the two sequences (51, 52) is done by matching each of the source image segments (13) with the reference silhouette (13') that is at the same position within its sequence, computing a matching error that indicates how closely they match, and computing from the matching errors of the source image segments a sequence matching error;

for each of these selected sequences of reference silhouettes (13'), retrieving a reference pose that is associated with one of the reference silhouettes (13'); and computing an estimate of the pose of the articulated object model (4) from the retrieved reference pose or poses.

2. The method of claim 1, wherein
one image of the sequence of source images (10) is designated a frame of interest (56), and the source image segment (13) that is generated therefrom is designated a source image segment of interest;

the sequence matching error is a weighted sum of the matching errors of the match of the two sequences (51, 52);

the weight of the matching error for the source image segment of interest is largest and decreases with the distance of the source image segments from the source image segment of interest; and the reference pose is retrieved for the reference silhouette that was matched with the source image segment of interest.

3. The method of claim 1 or claim 2, wherein at least two sequences of source images (10) recorded by at least two source cameras (9, 9') at the same time are obtained and processed, and wherein the estimate of the pose of the articulated object model (4) is computed from the retrieved reference poses determined from the at least two sequences of source images by choosing a combination of retrieved reference poses that agree best in 3D space.

4. The method of one of claims 1 through 3, comprising the following steps for establishing local consistency between two poses determined from at least one sequence of consecutive source image segments, each pose being associated with at least one source image segment (13) wherein elements, that is, joints (2) and/or links (3), of the articulated object model (4) in one or both of the poses correspond to limbs of the real world object (14) that can be labeled in an ambiguous manner:

for each one of a pair of consecutive source image segments, determining, from the associated pose and for each one of the possible ambiguous labellings of each pose, a corresponding labeling, in the source image segment, of image points from limbs;

choosing, for a first one of the pair of consecutive source image segments, a labeling of the pose;

computing an optical flow between the first one and a second one of this pair of consecutive source image segments;

determining, from the optical flow, locations in the second image segment to which the image points corresponding to the limbs of the first image segment have moved, and labeling these locations in the second image segment according to the labeling of the limbs in the first image segment;

choosing, of the possible ambiguous labellings of the pose for the second image segment that were used to label the image points according to the pose, the labeling which is consistent with the labeling determined from the optical flow.

5. The method of claim 4, wherein the step of labeling, in the source image segment, of image points from limbs is done by for each one of a pair of consecutive source image segments, determining, from the associated pose and for each one of the possible ambiguous labellings of each pose, a projection of a model of the real world object (14) into the source image, and therefrom labeling image points of the source image segment according to the projected limb that is visible at the location image point.

6. The method of claim 4 or claim 5, wherein a sequence of poses, each pose being associated with one of a sequence of source image segments, is given, and wherein an ambiguity regarding the labeling of one or more limb sets exists, comprising the following steps for establishing global consistency of poses matched to a sequence of consecutive source images for each source image segment (13) of the sequence of source images,
retrieving the associated pose and the labeling of model elements that were determined by the previous steps;
determining the pose in the database that has the smallest distance from the retrieved pose, taking into account the labeling of the database poses;
computing a consistency error term that expresses the difference between the two poses;
computing, from these consistency error terms, a total consistency error for the entire sequence of source images;
repeating the above steps for computing the total consistency error for all variants of possible global labellings of the ambiguous limb sets;
choosing the variant of global labellings for which the total consistency error is smallest.

7. The method of claim 6, wherein the total consistency error is the sum of all consistency error terms over the sequence.

8. A computer-implemented method for optimizing an estimate of a pose of an articulated object model (4), preferably performed on an estimate found by the method of one of the claims 1-7, wherein the articulated object model (4) is a computer based 3D model (1) of a real world object (14) observed by one or more source cameras (9), and the articulated object model (4) represents a plurality of joints (2) and of links (3) that link the joints (2), and wherein the pose of the articulated object model (4) is defined by the spatial location of the joints (2), the method comprising the steps of given an estimate of the pose of the articulated object model (4) and a set of source image segments (13) each comprising a view of the real world object (14) represented by the articulated object model (4) observed at the same time from different viewpoints
performing an optimization procedure in which the pose of the articulated object model (4) is varied in order to minimize an error function, wherein the error function comprises a model matching error which is computed over all views and penalizes poses whose joint positions, when projected into the views corresponding to the set of source image segments, do not match the source image segments.

9. The method of claim 8, wherein the model matching error comprises a silhouette filling error term which penalizes joint positions that, when projected into the views corresponding to the source image segments, cause points within the silhouette to be distanced from a closest element of the articulated object model (4).

10. The method of claim 9, comprising the step of computing the silhouette filling error term by finding, for each raster point within the silhouette, the distance to the closest element of the projection of the articulated object model (4), according to its pose, into the view being considered, summing these distances over all raster points within the silhouette, and normalizing.

11. The method of one of claims 8 through 10, wherein the model matching error comprises a silhouette matching error term which penalizes joint positions that, when projected into the views corresponding to the source image segments, fall outside a silhouette of the respective source image segment.

12. The method of claim 11, comprising the step of computing the silhouette matching error term by projecting each joint (2) from its spatial location into the 2D view of each of the source cameras corresponding to the source image segments, computing, for each joint (2) and in each 2D view, a distance of the projected joint (2) from the silhouette of the source image segment, normalizing each distance according to the size of the corresponding silhouette, and adding the normalized distances.

13. The method of one of claims 8 through 12, wherein the error function comprises a distance to database error term which represents the deviation of the pose from the closest pose in the database.

14. The method of claim 13, comprising the step of computing the distance to database error term by computing, over all joints (2), a deviation of the joint angles of the pose from the angles of the pose from the closest pose in the database.

15. The method of one of claims 8 through 14, wherein the error function comprises a smoothness error term which penalizes at least one of large changes in joint angles and large movements between poses corresponding to consecutive frames.

16. The method of one of claims 8 through 15, wherein the error function comprises a length error term which penalizes poses in which the length of links (3) deviates from reference link lengths.

17. The method of claim 8 through 16, wherein the error function comprises a flow error term which penalizes poses for which an expected position of a limb, as computed from an adjacent frame according to the optical flow between the two images, differs from the projection of the pose into the image.

18. A non-transitory computer readable medium comprising computer readable program code encoding a computer program that, when loaded and executed on a computer, causes the computer to perform the method of one of the preceding claims.

19. A method of manufacturing a non-transitory computer readable medium, comprising the step of storing, on the computer readable medium, computer-executable instructions which when executed by a processor of a computing system, cause the computing system to perform the method steps of one of claims 1 to 17.

20. A computer system comprising a processing unit (15) configured to interact with storage unit (16) for storing at least one of source images (10) and source image segments (13), the processing unit (15) being programmed to perform the method steps of one of claims 1 to 17.

* * * * *